UNITED STATES PATENT OFFICE.

THOMAS H. BARTLETT, OF LOS ANGELES, CALIFORNIA.

HAIR-TONIC.

No. 920,902.  Specification of Letters Patent.  Patented May 11, 1909.

Application filed October 31, 1908. Serial No. 460,545.

*To all whom it may concern:*

Be it known that I, THOMAS H. BARTLETT, a citizen of the United States, residing at Los Angeles, in the county of Los Angeles and State of California, have invented a new and useful Hair-Tonic, of which the following is a specification.

This invention relates to a compound for treating the hair to increase its growth and restore it to its natural color.

The object of the invention is to provide a compound of this character that shall be easy to apply, have no objectionable features, and which will contain no substance that can in any way injure the scalp or the follicles of the hair.

With the above and other objects in view, as will appear as the nature of the invention is better understood, the same consists in the novel compound for treating the hair hereinafter described and claimed.

The compound consists of the following ingredients; pork fat, mutton tallow, olive oil, camphor, and bean oil. These ingredients are proportioned and compounded as follows: I take three cups of common white beans, and three pounds of salt pork. The beans are par-boiled, and then boiled with the pork for eight hours, and then covered tight and baked for twelve hours. From the baked pork and beans I obtain twenty-four teaspoonfuls of grease. I then fry out sufficient mutton suet to obtain three teaspoonfuls of tallow which is added to the grease obtained from the pork and beans, and I then add five grams of gum camphor, together with one teaspoonful of olive oil. This mixture is scented with fifteen drops of lavender oil or rose oil, the perfume being added when the mixture is nearly cold. The mixture is well shaken and is then ready for use.

In the use of the compound, the same is rubbed into the hair and scalp, and will be found not only to invigorate the scalp and to promote a growth of hair, but also to restore it to its natural color.

The bean oil when combined as herein stated acts as a healing agent, and stimulates the growth of hair, and the camphor is employed as a sedative.

What is claimed is:

The herein described compound for treating hair consisting of pork fat, mutton tallow, olive oil, camphor, and bean oil, in substantially the proportions specified.

In testimony that I claim the foregoing as my own, I have hereto affixed my signature in the presence of two witnesses.

THOMAS H. BARTLETT.

Witnesses:
DAVID DODDS,
CHARLES H. WALKER.